US008301954B2

(12) United States Patent
Larsson et al.

(10) Patent No.: US 8,301,954 B2
(45) Date of Patent: Oct. 30, 2012

(54) METHOD AND ARRANGEMENT IN A COMMUNICATION NETWORK SYSTEM

(75) Inventors: Kjell Larsson, Luleå (SE); Peter Ökvist, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 274 days.

(21) Appl. No.: 12/667,335

(22) PCT Filed: Jul. 4, 2007

(86) PCT No.: PCT/SE2007/050492
§ 371 (c)(1),
(2), (4) Date: Dec. 30, 2009

(87) PCT Pub. No.: WO2009/005428
PCT Pub. Date: Jan. 8, 2009

(65) Prior Publication Data
US 2011/0010597 A1 Jan. 13, 2011

(51) Int. Cl.
G08C 25/02 (2006.01)
(52) U.S. Cl. ...................................................... 714/748
(58) Field of Classification Search ................... 714/748
See application file for complete search history.

(56) References Cited

U.S. PATENT DOCUMENTS

| 6,654,922 | B1 * | 11/2003 | Numminen et al. | 714/748 |
|---|---|---|---|---|
| 6,779,147 | B2 * | 8/2004 | Chen | 714/748 |
| 6,931,077 | B2 * | 8/2005 | Aizawa et al. | 375/295 |
| 7,697,483 | B2 * | 4/2010 | Usuda et al. | 370/331 |
| 8,010,115 | B2 * | 8/2011 | Sågfors et al. | 455/442 |
| 2003/0081692 | A1 * | 5/2003 | Kwan et al. | 375/295 |
| 2005/0220042 | A1 * | 10/2005 | Chang et al. | 370/278 |
| 2006/0013268 | A1 * | 1/2006 | Terry | 370/537 |
| 2006/0059399 | A1 * | 3/2006 | Hu et al. | 714/748 |
| 2006/0171349 | A1 * | 8/2006 | Holma et al. | 370/328 |
| 2008/0046793 | A1 * | 2/2008 | Heo et al. | 714/748 |
| 2010/0023833 | A1 * | 1/2010 | Pan et al. | 714/748 |
| 2010/0115368 | A1 * | 5/2010 | Terry et al. | 714/748 |
| 2010/0169724 | A1 * | 7/2010 | Terry | 714/704 |

FOREIGN PATENT DOCUMENTS

| JP | 2010-506458 | 2/2010 |
|---|---|---|
| WO | WO 2007/016553 A1 | 2/2007 |
| WO | WO 2008/042811 A2 | 4/2008 |

OTHER PUBLICATIONS

International Search Report for PCT/SE2007/050492, mailed Apr. 17, 2008.
TSG-RAN Working Group 4 (Radio) meeting #34; R4-050080; "E-TFC selection and reporting of UE power situation", (Feb. 14-18, 2005), section 1-4.

(Continued)

*Primary Examiner* — Yolanda L Wilson
(74) *Attorney, Agent, or Firm* — Nixon & Vanderhye, P.C.

(57) ABSTRACT

A method and an arrangement enables an efficient radio resources utilization in a communication network system comprising a communication network node communicating with one or more user equipments over a radio interface on uplink and downlink channels. The user equipment provides the communication network node with information about a power shortage problem in the user equipment by using a pre-determined field, such as the E-TFCI field, of the uplink channel, whereby the communication network node is allowed to take a pre-determined action regarding available radio resources.

13 Claims, 4 Drawing Sheets

OTHER PUBLICATIONS

3GPP TS 25.321 V7 4.0 (Mar. 2007); $3^{rd}$ Generation Partnership Project; Technical Specification Group Radio Access Network; Medium Access Control (MAC) protocol specification (Release 7), www.#GPP.org, section 9.2.5-11.9.3.

Japanese Office Action issued in Application No. 2010-514681 dated Apr. 16, 2012 with English Translation.
E-TFC Selection and Reporting of UE Power Situation, TSG-RAN Working Group 4 (Radio) Meeting #34, R4-050080, Feb. 14, 2005.

* cited by examiner

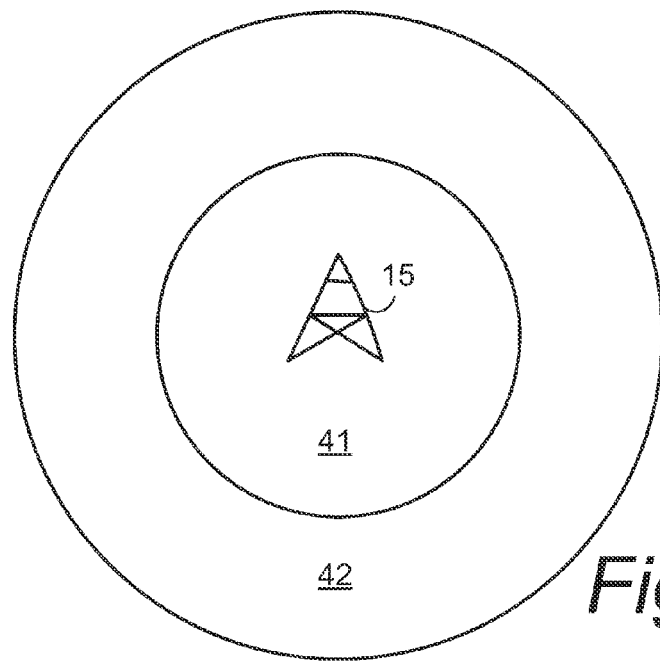
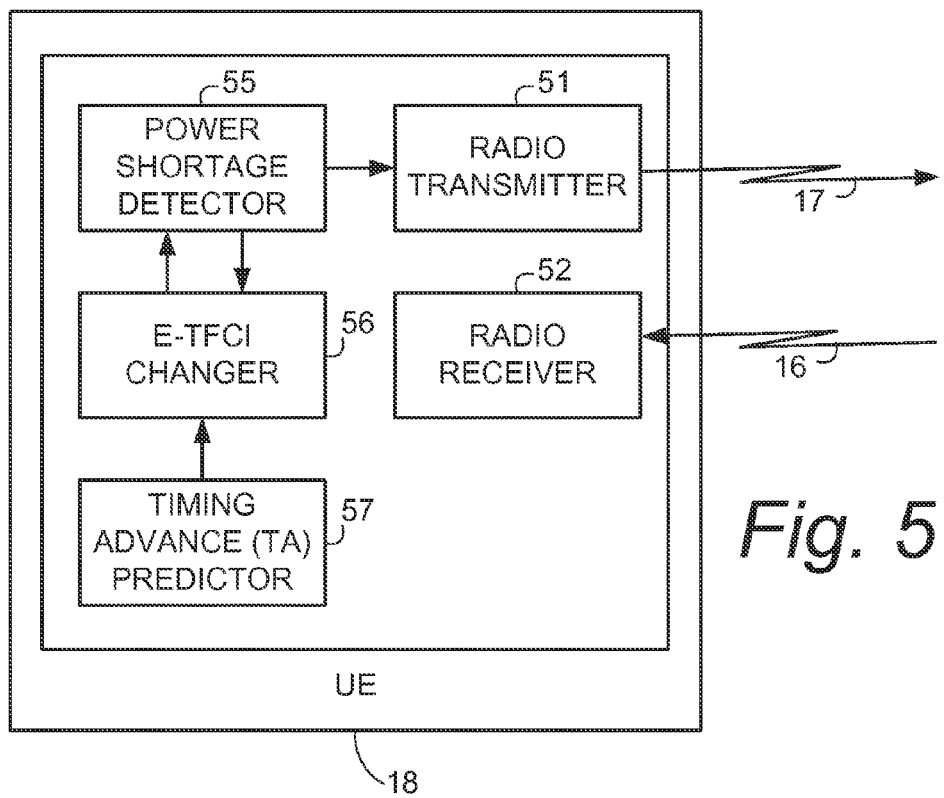

METHOD AND ARRANGEMENT IN A COMMUNICATION NETWORK SYSTEM

This application is the U.S. national phase of International Application No. PCT/SE2007/050492 filed 4 Jul. 2007, which designated the U.S., the entire contents of which hereby incorporated by reference.

TECHNICAL FIELD

The technology disclosed herein relates to a method and an arrangement in a communication network system and more particularly to an arrangement allowing for enabling an efficient radio resources utilization as well as a method for such enabling.

BACKGROUND

In the current system and functionality description for the Enhanced uplink, in the 3GPP specification, the involved mechanism for rate selection is described from a user equipment (UE) perspective. Basically the UE should use the minimum rate selected among "system granted rate" or "UE evaluated maximum rate based on power consumptions".

When the UE is limited by its own maximum Tx power, it has to evaluate which rate it can support (the UE does this evaluation all the time in order to find out whether it is power or grant limited) in order not to end up in a power shortage situation. With a power shortage situation is meant that the UE does not have enough power to transmit a selected block, i.e. the UE has not failed to transmit a specific enhanced dedicated channel transport format combination (E-TFC), but the transport block is transmitted with such low power that the Node B cannot detect the transmission correctly.

When the UE starts to experience power shortage, the long term (and preferred) solution is to change the used E-TFC so that the available power is enough for a proper transmission. This action takes some transmission time intervals (TTIs) to accomplish. During this execution time, the UE starts to temporarily reduce the power allocation to the Enhanced dedicated physical data channel (E-DPDCH).

The E-TFC evaluation is based on the used power for the dedicated physical control channel (DPCCH) together with power offset values for each existing transport format (E-TFC), i.e. $\beta_{ed}$. Based on the DPCCH power and $\beta_{ed}$'s, the UE evaluates which E-TFC it can support. The intermediate temporal power reduction is carried out by reducing the $\beta_{ed}$ factor on slot basis.

Another function involved is the outer-loop power control (OLPC). In enhanced uplink (EUL), the input to the OLPC is the information on the number of Transmission Attempts (TA). An OLPC up-step is executed when the targeted number of transmission attempts is exceeded. A radio link control (RLC) re-transmission is executed if the maximum number of TAs is exceeded. Information on the number of TAs is available to the radio network controller (RNC) for correctly received blocks or in the case where the hybrid automatic repeat request (HARQ) completely fails to decode the blocks; i.e. the blocks are still un-decoded after the maximum number of TAs. In TTIs where the blocks are received incorrectly by the HARQ, no message is sent to the OLPC. The OLPC will not have any information to work on during that TTI, and consequently not take any action.

When the UE has a higher grant than it can use, the UE has to trust its own evaluation of which format that can be used without ending up in power shortage. It is important that the UE succeeds with this evaluation, since, if it fails and runs into power shortage, extra transmissions will most likely be needed (i.e. more transmissions than the target number of transmissions). When the targeted number of transmissions is not fulfilled, the OLPC will increase the signal-to-interference ratio (SIR) target.

More specifically, a UE in power shortage will likely not get through with the first TA (assuming a transmission target of one transmission in this example), and the SIR-target will be increased by the OLPC. At next TTI border, a new transport block (TB) size is selected by the E-TFC selection functionality and a new required-power-per-block estimate is performed. Still short of power, the loop 'lack of power'→'OLPC up-step'→'increased SIR-target'→'new E-TFC selected' might continue until a minimum E-TFC is selected. The problem is severe when the UE is transmitting with the smallest available E-TFC, thus not able to select any smaller format that potentially could improve the situation. During this time, the SIR-target might have been increased several dBs. Unnecessarily high SIR levels have impact on system throughput, but more alarming, severe impact on end-user throughput too.

In extreme cases when the UE only transmits data infrequently, e.g. only has power enough to transmit data during short times, the SIR-target can increase rapidly, which is undesired. As a consequence, the UE gets it even more difficult to transmit any data again since the power allocation to the control channel has been increased.

In power shortage where the SIR-target has been raised one (or several times), i.e. having a marginal with respect to the foreseen SIR-target value, this rise/marginal might show up not to be sufficient when the UE tries to transmit another E-TFC (with the outcome of increased SIR-target once again). In other words, the current E-TFC selection mechanism in combination with an OLPC is not optimal.

Currently, the UE can signal the power situation to the Node B (upon request of the Node B) by means of a power headroom report, i.e. 'UE Power Headroom' (UPH) in the uplink (UL) Scheduling information. The UPH field indicates the ratio of the maximum UE transmission power and the corresponding DPCCH code power. This signalling provides information on DPCCH power levels, and by knowledge of the involved beta-factor, you got information on all powers. The shortcomings are that neither any power-dependent trigger mechanism is defined, nor that periodical signalling is realistic due to the power consumption, nor that the UE can decide when to inform the Node B about its power situation. Additionally, typical time resolution of the currently used methods (system polls or periodical signalling) is in the order of several TTIs, which is too long to be optimal.

SUMMARY

Accordingly, it is an objective with the technology disclosed herein to provide an improved method of enabling an efficient radio resources utilization in a communication network comprising a communication network node communicating with one or more user equipments over a radio interface on uplink and downlink channels.

According to a first aspect of the technology disclosed herein this objective is achieved through a method which specifies that efficient radio resource utilization in a communication network is enabled by providing said communication network node with information about a power shortage problem in a user equipment by using a pre-determined field of said uplink channel, whereby said communication network node is allowed to take a pre-determined action regarding available radio resources.

Another objective with the technology disclosed herein is to provide an improved arrangement for enabling an efficient radio resources utilization in a communication network comprising a communication network node communicating with one or more user equipments over a radio interface on uplink and downlink channels.

According to a second aspect of the technology disclosed herein this other objective is achieved through an arrangement wherein efficient radio resource utilization in a communication network is enabled by an arrangement comprising means for providing said communication network node with information about a power shortage problem in a user equipment by using a pre-determined field of said uplink channel, whereby said communication network node is arranged to take a pre-determined action regarding available radio resources.

Thanks to the provision of a method and an arrangement which uses the E-TFCI field for reporting a power shortage problem, an extremely fast response on that something is not good is achieved. No new signalling fields are needed and the solution does not cost any extra space. Not all bits are used so, there is space left for other information and it is only used in problematic situations.

Still other objects and features of the technology disclosed herein will become apparent from the following detailed description considered in conjunction with the accompanying drawings. It is to be understood, however, that the drawings are designed solely for purposes of illustration and not as a definition of the limits of the technology disclosed herein, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 4 illustrates how the user equipment uses the inventive method to increase its coverage area;

FIG. 5 is a block diagram of a user equipment comprising an arrangement according to an example embodiment;

DETAILED DESCRIPTION

Figure 1:
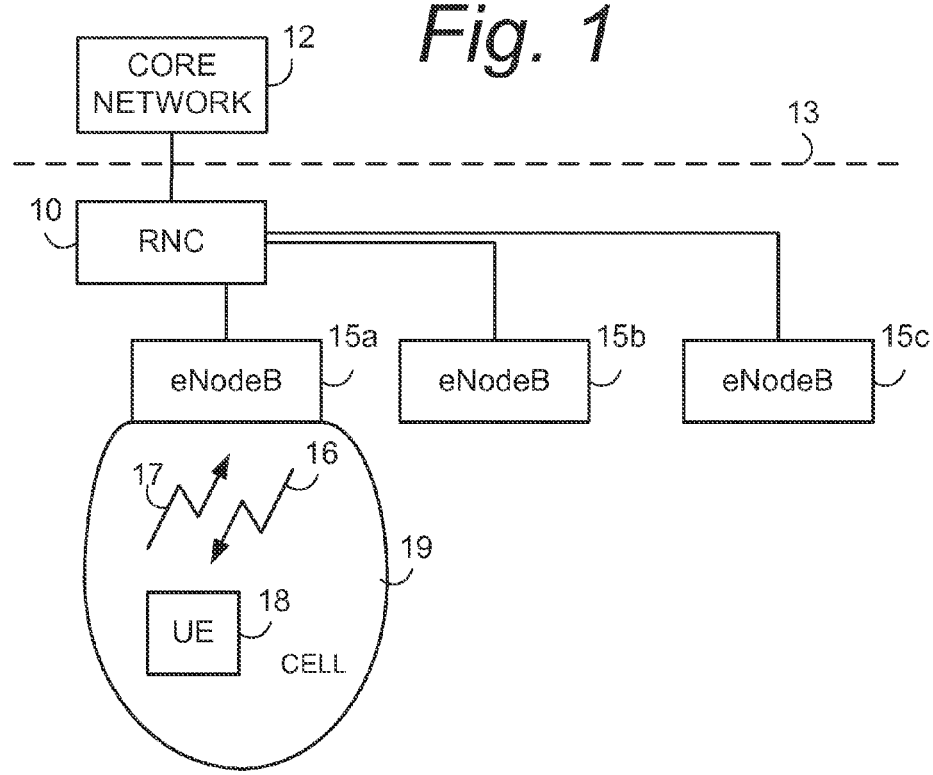
FIG. 1 shows the communication network architecture according to the technology disclosed herein.

FIG. 1 depicts a communication system, such as a Wideband Code Division Multiple Access (WCDMA) system, including a Radio Access Network (RAN), such as the UMTS Terrestrial Radio Access Network (UTRAN) architecture, comprising at least one Radio Base Station (RBS) (or Node B or eNode B) 15a-c, connected to one of several Radio Network Controllers (RNCs) 10. The RAN is connected over an interface 13, such as the Iu-interface, to a Core network (CN) 12, which may be a connection-oriented external CN such as the Public Switched Telephone Network (PSTN) or the Integrated Services Digital Network (ISDN), and/or a connectionless external CN as the Internet.

The RAN and the CN 12 provide communication and control for a plurality of user equipments (UE) 18 (only one shown in FIG. 1). The UEs 18 each uses downlink (DL) channels 16 (i.e. base-to-user or forward) and uplink (UL) channels 17 (i.e. user-to-base or reverse) to communicate with at least one RBS 15 over a radio or air interface. Each RBS 15a-c serves at least one cell 19 in which the UEs 18 are situated or through which the UEs 18 are moving.

According to a preferred embodiment of the technology disclosed herein, the communication system is herein described as a WCDMA communication system. The skilled person, however, realizes that the inventive method and arrangement work very well on all communications system, such as the Code Division Multiple Access (CDMA) or 3G Long Term Evolution (LTE) system. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

Figure 2:
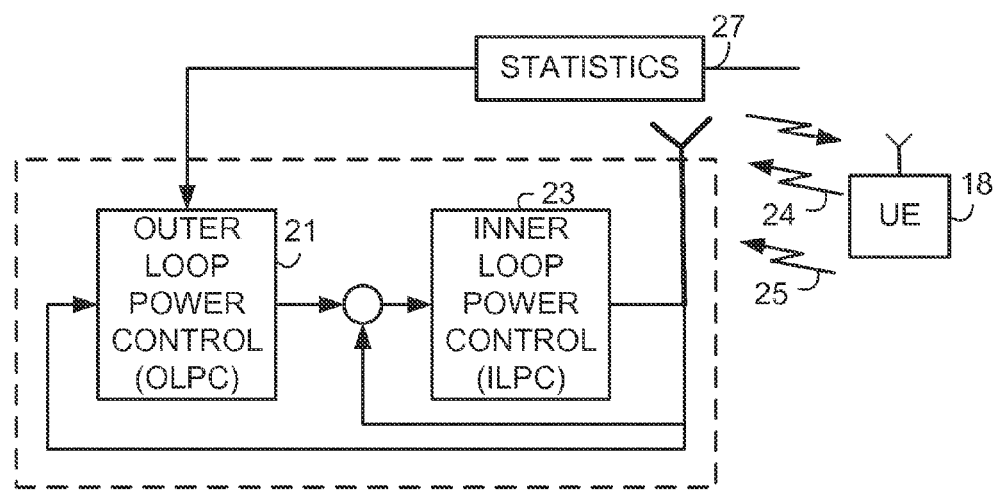
FIG. 2 is a block diagram showing a power control mechanism of the communication network.

FIG. 2 shows a power control mechanism which consists of two parts: an inner loop power control (ILPC) 23, located in the RBS 15, and an outer loop power control (OLPC) 21, located in either the RNC 10 or the RBS 15. The inner loop is fast and updates the user equipment transmission power 1500 times per second in order to combat fast fading. This is done by measuring the received Signal to Interference Ratio (SIR), comparing it with a SIR target, and sending a power control command to the user equipment 18. If the received SIR is below the SIR target, the user equipment 18 is instructed to increase the transmission power and vice versa if the received SIR is above the target. The inner loop power control operates on the DPCCH. The transmission power of the E-DPDCH is set relative to the DPCCH and depends on the instantaneous data rate on the E-DPDCH.

The outer loop sets the SIR target for the inner loop and uses available statistics 27 for this purpose. The outer loop is significantly slower than the inner loop and adapts to slow changes in the radio conditions to match the SIR target to the required quality of service.

In the uplink direction, several channels from each UE 18 will be transmitted with the enhanced uplink as illustrated in FIG. 2. The Dedicated Physical Control Channel (DPCCH), not shown in FIG. 2, carries pilot symbols and parts of the outband control signalling. Remaining outband control signalling for the enhanced uplink is carried on the Enhanced Dedicated Physical Control Channel (E-DPCCH) 25, while the Enhanced Dedicated Physical Data Channel (E-DPDCH) 24 carries the data transmitted using the enhanced uplink features.

The basic idea of the technology disclosed herein is to allow the UE to inform the system about a power shortage situation so that the system can prevent the OLPC to increase the SIR-target too rapidly/too high. The UE is proposed to use an expansion/reuse of the already existing E-TFCI field (in the E-DPCCH channel, 7 bits) as the signalling mechanism.

As is now, the E-TFCI field of the E-DPCCH 25 contains information about the transmitted E-TFC for each transmission attempt. Since it is not allowed to change E-TFC for the retransmissions, neither is the E-TFCI changed. The RBS should already know the E-TFCI when it detects that a transmission is a retransmission, which means that the E-TFCI field is of less importance for retransmissions. Therefore, the E-TFCI field should be used for something more relevant, for example to transmit the "Healthy Information Tag" (HIT)

when needed. Since the support of HIT-functionality requires changes in the 3GPP standard, this functionality can only be supported by compliant UEs.

Figure 3A:
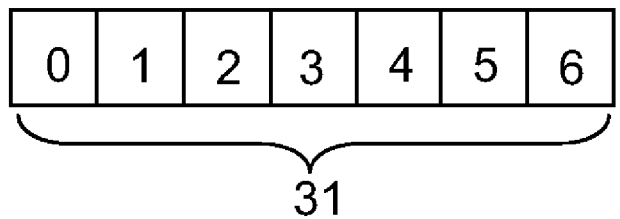
FIG. 3a shows a general E-TFCI field (7 bits)

As can be seen in FIG. 3a, the E-TFCI field contains 7 bits denoted 31 in FIG. 3a which gives 128 different combinations. Among these combinations, all (except of one) correspond to E-TFCs in the transport format table. In addition to this field, a 3-bit retransmission sequence number (RSN) is also transmitted in each transmission so that the RBS can know how to decode the data; i.e. if it should soft combine the data with data from other transmission attempts. RSN is equal to zero for the first transmission (in FIG. 3a), and if more than four transmissions are used, RSN pattern 3 is repeated.

Providing the system with information about power shortage can be done in a few different ways, each offering different degrees of freedom for how the system should react. When the system gets information about the power shortage situation, the system can disable the OLPC, or only allow it to slightly increase the SIR-target (or to a certain level).

Together with the information signalled about how many transmission attempts that have been used, the power shortage information can be sent to the OLPC when located in the RNC 10. Support for the corresponding signalling has to be added. The concept is applicable for an OLPC located in the RBS as well.

Below are described three examples how the power shortage is reported and how the corresponding information is utilized further:

A) According to a first preferred embodiment of the technology disclosed herein, the straightforward solution is to only use ONE unique pattern to signal power shortage. Depending on the used E-TFC table, i.e. Table 0 or Table 1, there are unused E-TFCI positions that could be used for such purposes. This approach does not result in any problems for the RBS to detect which E-TFC format that is used since this signalling will only be used for retransmissions (since the UE cannot understand if it really had power shortage before it performed the first transmission).

This should be signalled for every retransmission from that the power shortage is detected. If no power shortage exists, the E-TFCI field is unaffected.

However, if the UE could estimate the targeted transmission attempt, or if such could be signalled from the system, the signalling of power shortage should not be performed before the UE has performed the target number of transmissions. The reason of this is that if the UE is in soft handover, and one of the base stations does not detect the E-TFCI in first transmissions, it can be achieved in a later transmission. The power shortage situation is of interest for the system only if more than the targeted number of transmissions is needed.

Power shortage is e.g. defined as: X% of the used slots has reduction of the data channel (i.e. a $\beta_{ed}$ reduction) of more than Y dB.

B) A second preferred embodiment of the technology disclosed herein describes a slightly more complex method which uses the entire E-TFCI field to signal the presence of UE power shortage. In this case, it is important to stay away from the currently used E-TFCI pattern when identifying the power shortage situation.

Figure 3B:
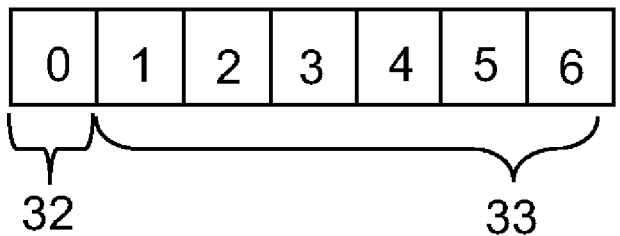
FIG. 3b shows an E-TFCI field according to one preferred embodiment of the technology disclosed herein.

For example, this can be done by toggling the Most Significant Bit (MSB) in the E-TFCI field and use the remaining 6 bits to indicate the level of power shortage. In this way, you have 64 different levels of granularity to quantify the power shortage. This is illustrated in FIG. 3b, which shows the E-TFCI for RSN>0 and in which the toggle bits (x bits) is denoted 32 and the UE power status (7-x bits), which gives information of the power shortage, is denoted 33.

Power shortage can be defined as the average slot compression of the transmitted slots for a given HARQ process. This will allow the system to know how severe the power situation is, and hence, better chose how to react.

The corresponding signalling is as described in bullet A above (and also in FIG. 6 described below).

Figure 3C:
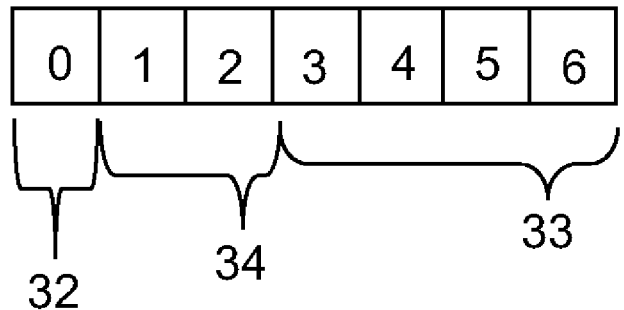
FIG. 3c shows an E-TFCI field according to another preferred embodiment of the technology disclosed herein.

C) Given that the UE can know what the system TA-target is, either from internal measuring and calculations, or signalled from the system, the obvious extension to the power shortage reporting procedure stated in B is that the UE can decide to use more transmission attempts than the original TA by performing the E-TFC selection so that it takes a number of extra transmissions into account. If this is done, the 6 bits used for power shortage reporting (as described above and shown in FIG. 3b) is divided into two groups; e.g. the first two bits should be used to report how many extra transmissions the UE plans to use, and the last four bits to signal the degree of power shortage. The use of extra transmissions should preferable only be used for the lowest E-TFC format(s). This is illustrated in FIG. 3c, which shows the E-TFCI for RSN>0 and in which the toggle bits (x bits) is denoted 32, TA information (y bits) is denoted 34 and the UE power status (7-x-y bits) is denoted 33.

For example, a UE targeting one transmission attempt, which failed, estimates that the transport block would be correctly received by the RBS if additional TAs were used (in this example, one additional transmission). After that, the UE performs the retransmission and in parallel signals that target now is one extra transmission and the corresponding power reduction ratio (or similar).

From the method in B, the system can use the signalled average slot compression information to conclude how many extra retransmissions that should have been needed (which is the information that the UE transmits in C). This information can be used in the OLPC to adjust the triggering mechanism to avoid unwanted up-steps.

The inventive method may also be used by the UE to increase its coverage, which is illustrated in FIG. 4. In FIG. 4, 41 illustrates the coverage are following the TA-target and 42 is the coverage area according to the case C described above, wherein the UE uses TA>target to increase the coverage. The UE 18 evaluates power shortage which it signals to the RBS 15. The RBS passes the power shortage information on to the RNC wherein the OLPC can be located. Note that the OLPC can be located in the RBS as well. If the UE 18, according to the technology disclosed herein, uses a modified E-TFCI field to make the system aware of its power situation, the OLPC in e.g. RNC can according to the power information, decide not to increase the SIR-target further sine a power limited UE likely not can make use of it. E.g. a scheduler located in the RBS could use power shortage information to take actions to further utilize/optimize the radio resource. To extent the coverage, the UE could use a modified E-TFCI filed including TA information to tell the OLPC that additional transmissions (exceeding the targeted number of transmissions set by RNC) actually are according to the UE's strategy and that the OLPC should not increase the SIR-target accordingly. This should only be used for the lower/lowest E-TFCI format(s).

The general methodology of avoiding unwanted SIR-target behaviour by means of UE power shortage indication/feedback by using and modified E-TFCI field is applicable for R99-like systems as well. However, in this specific case, it might be necessary to let the system specify a TFCI value that has this meaning.

FIG. 5 is a block diagram showing the user equipment 18 provided with the inventive arrangement 53. The arrangement 53 comprises a radio transmitter 51, arranged to transmit data over the radio interface on the uplink channel 17, and a receiver 52 arranged to receive data on the downlink channel 16. The arrangement 53 further comprises means for detecting a power shortage situation which is illustrated as 55, whereby the radio transmitter 51 is arranged to transmit information about a power shortage problem in the user equipment 18 by using a pre-determined field of the uplink channel 17 (which in the preferred embodiment is the E-DPCCH denoted 25 in FIG. 2), whereby the communication network node (the RNC or the RBS) is allowed to take a pre-determined action regarding available radio resources.

The arrangement 53 further comprises means 56 for changing the pre-determined field (E-TFCI) which signals a power shortage problem in the user equipment 18, and means 57 for predicting targeted transmission attempts, whereby the means 56 for changing the pre-determined field signalling a power shortage problem is arranged to perform said change when the estimated number of transmissions has been transmitted. The means 57 for predicting targeted transmission attempts either estimates targeted transmission attempts or gets the targeted transmission attempts signalled from the network. Optionally, the means 56 for changing the pre-determined field is arranged to toggle a most significant bit (MSB) in the pre-determined field, to use a pre-determined number of bits to report how many extra transmission the user equipment 18 plans to use and/or to use the remaining bits to indicate the level of power shortage. FIG. 5 is just an illustrative block diagram showing, by example only, different functions in a user equipment 18.

Figure 6:
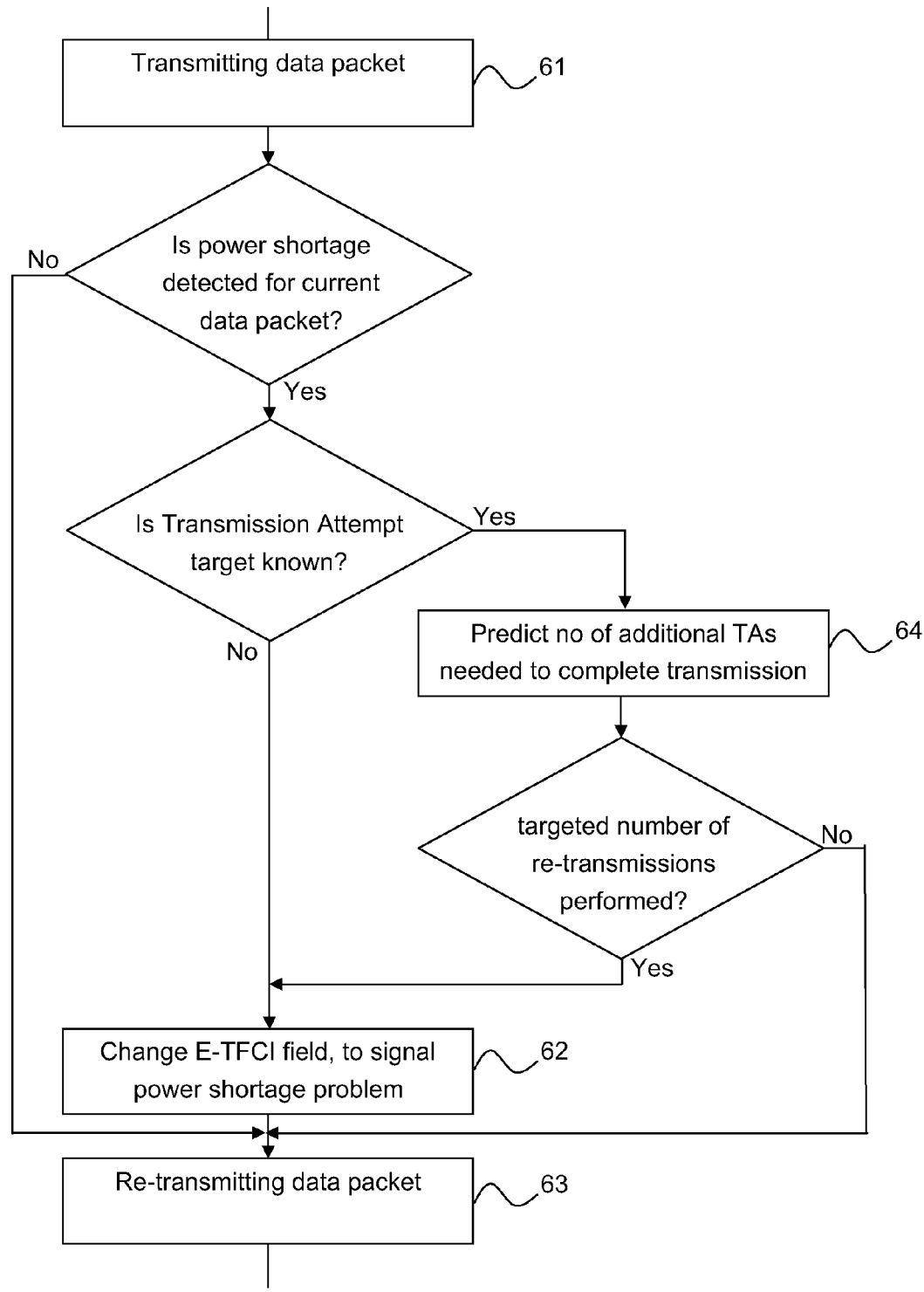
FIG. 6 is a flowchart illustrating example procedure steps performed in an example embodiment of the user equipment.

The procedure in the user equipment for enabling an efficient radio resources utilization in a communication network according to a preferred embodiment, shown in FIG. 6, is as follows:
1) transmitting data packets from the user equipment to the network system on the E-DPDCH (step 61);
2) detecting a power shortage problem in the user equipment;
3) changing the E-TFCI field of the E-DPCCH in order to signal the power shortage problem to the network system (step 62);
4) re-transmitting the data packet comprising the changed E-TFCI field on the E-DPCCH (step 63);
5) 5. optionally, predicting how many extra transmission attempts (step 64) that are needed and when the targeted number of re-transmissions have been performed, changing the E-TFCI field (step 62) and re-transmitting the data packet comprising the changed E-TFCI field (step 63).

To facilitate understanding, many aspects of the technology disclosed herein are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the technology disclosed herein can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, a portable compact disc read only memory (CD-ROM), and a universal serial bus (USB) memory.

Modifications to embodiments of the technology disclosed herein described in the foregoing are possible without departing from the scope of the technology disclosed herein as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of enabling an efficient radio resources utilization in a communication network system comprising a communication network node communicating with one or more user equipments over a radio interface on uplink and downlink channels, the method comprising:
providing said communication network node with information about a power shortage problem in a user equipment by using a pre-determined field of said uplink channel during a retransmission;
predicting a targeted number of transmission attempts;
changing said pre-determined field signalling a power shortage problem when the target number of transmissions has been transmitted; and
retransmitting said data whereby said retransmission comprises said changed pre-determined field; and
the communication network node using the information to take a pre-determined action regarding available radio resources.

2. A method according to claim 1, further comprising:
transmitting data to said communication network node;
detecting a power shortage situation in said user equipment;
changing said pre-determined field signalling a power shortage problem;
retransmitting said data whereby said retransmission comprises said changed pre-determined field.

3. A method according to claim 2, further comprising signalling said power shortage problem by using a unique pattern on said pre-determined field.

4. A method according to claim 2, further comprising signalling said power shortage problem by using the entire pre-determined field.

5. A method according to claim 1, wherein said pre-determined field is an enhanced dedicated channel transport format combination indicator (E-TFCI) of an enhanced dedicated physical control channel (E-DPCCH).

6. A method according to claim 5, wherein said enhanced dedicated channel transport format combination indicator field further comprises a retransmission sequence number (RSN) in order to give said communication network node information on how to decode the transmitted data.

7. An arrangement for enabling an efficient radio resources utilization in a communication network comprising a communication network node communicating with one or more user equipments over a radio interface on uplink and downlink channels, the arrangement comprising:
   means for providing said communication network node with information about a power shortage problem in a user equipment by using a pre-determined field of said uplink channel during a retransmission;
   means for predicting a target number of transmission attempts;
   means for changing said pre-determined field signalling a power shortage problem when the predicted target number of transmissions has been transmitted;
   means for retransmitting said data whereby said retransmission comprises said changed pre-determined field; and
   wherein the communication network node being arranged to use the information about the power shortage problem to take a pre-determined action regarding available radio resources.

8. An arrangement according to claim 7, wherein the arrangement further comprises:
   means for transmitting data to said communication network node;
   means for detecting a power shortage problem in said user equipment;
   means for changing said pre-determined field signalling a power shortage problem;
   means for retransmitting said data whereby said retransmission comprises said changed pre-determined field.

9. An arrangement according to claim 8, wherein the arrangement is arranged to signal said power shortage problem by using a unique pattern on said pre-determined field.

10. An arrangement according to claim 8, wherein the arrangement is arranged to signal said power shortage problem by using the entire pre-determined field.

11. An arrangement according to claim 7, wherein said pre-determined field is an enhanced dedicated channel transport format combination indicator (E-TFCI) of an enhanced dedicated physical control channel (E-DPCCH).

12. An arrangement according to claim 11, wherein said enhanced dedicated channel transport format combination indicator field further comprises a retransmission sequence number (RSN) in order to give said communication network node information on how to decode the transmitted data.

13. A user equipment comprising an arrangement according to claim 7.

* * * * *